Figure 1:
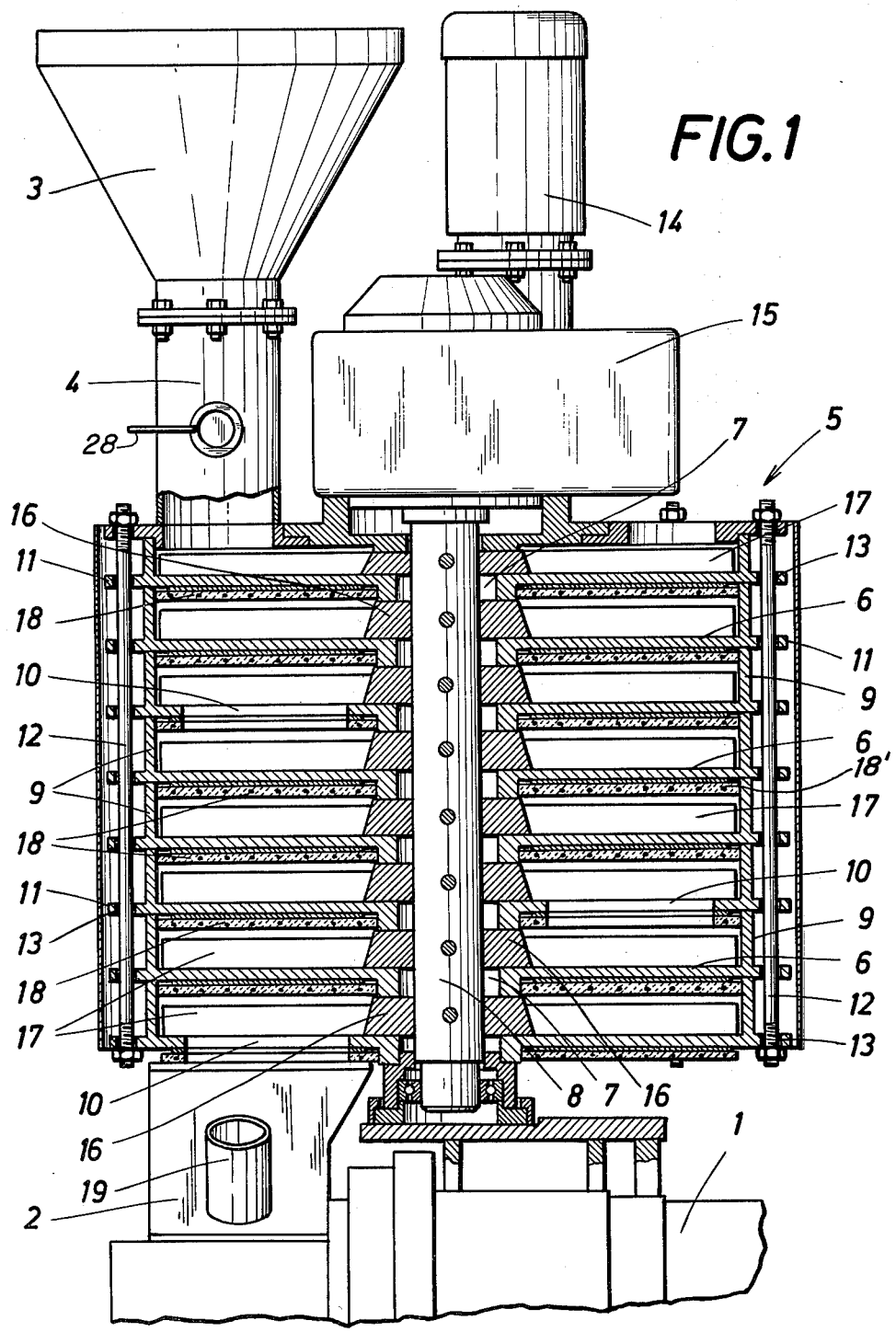

United States Patent [19]

Hanslik

[11] 4,059,401
[45] Nov. 22, 1977

[54] SCRAPER FLIGHT CONVEYOR FOR CONVEYING PREHEATED THERMOPLASTIC BULK MATERIAL TO A SCREW EXTRUDER

[75] Inventor: Wilhelm Hanslik, Vienna, Austria

[73] Assignee: Krauss-Maffei Austria Gesellschaft m.b.H., Asten, Austria

[21] Appl. No.: 676,931

[22] Filed: Apr. 14, 1976

[30] Foreign Application Priority Data

Apr. 16, 1975 Austria .................................. 2915/75

[51] Int. Cl.² ............................................... F27B 9/02
[52] U.S. Cl. ...................................... 432/132; 34/60; 432/139; 432/239
[58] Field of Search ...................... 34/12, 60; 432/129, 432/130, 131, 132, 139, 151, 239

[56] References Cited

U.S. PATENT DOCUMENTS

| 241,653 | 5/1881 | Harrison | 34/60 X |
| 979,349 | 12/1910 | Spirlet | 432/129 |
| 1,115,263 | 10/1914 | Wedge | 432/132 |
| 1,499,850 | 7/1924 | Bonnard | 432/131 |
| 1,647,050 | 10/1927 | Mackay | 432/131 |
| 2,888,254 | 5/1959 | Hermann | 432/131 |
| 3,531,872 | 10/1970 | Watson et al. | 34/60 |

*Primary Examiner*—John J. Camby
*Attorney, Agent, or Firm*—Kurt Kelman

[57] ABSTRACT

A scraper flight conveyor for preheating thermoplastic bulk material and feeding it to a screw extruder comprises a succession of controllably heated slideways arranged in superposed series, a plurality of scraper flights in sliding contact with each slideway and spaced along a path of travel over the surface thereof, and a drive operable to move the scraper flights on each slideway along the path of travel. The scraper flights push discrete portions of the thermoplastic bulk material along the path of travel. The delivery rate of the material to the slideways is controlled.

3 Claims, 2 Drawing Figures

SCRAPER FLIGHT CONVEYOR FOR CONVEYING PREHEATED THERMOPLASTIC BULK MATERIAL TO A SCREW EXTRUDER

This invention relates to a heated feeder conveyor for feeding a screw extruder with thermoplastic bulk material in the form of powder, granules, chips, or scrap.

Because the feeder conveyor is heated, the material to be fed to the extruder is supplied before entering the extruder with at least part of the heat which is required for processing and particularly for softening the material. For reasons which will be explained hereinafter, the known feeder conveyors can preheat the material only to a rather slightly elevated temperature so that a major part of the required heat must be produced or supplied in the extruder itself and in high-duty extruders, in which the material is processed only during a short residence time, a major part of the heat to be supplied in the extruder must be generated by kneading the material because only small heat transfer surface areas are available in the extruder itself and the highest attainable or permissible end temperature of the processed material must be exceeded only by a small margin by the temperature attained by any heating means employed.

Whereas known heating means in a feeder conveyor may be used to preheat the material to be processed to a preselected average temperature, the use of such known heating means results in considerable temperature differences in the material. These temperature differences are a major cause for the limitation of the selected average temperature of the preheated material to a low value. Because temperature differences are possible, portions heated to a higher temperature may be softened by being preheated so that properties of the resulting end product are adversely affected and the processing of the preheated material is rendered much more difficult as the material becomes sticky and for this reason can be fed only with difficulty or may clog flow paths.

Some known feeder conveyors comprise belt conveyors, on which the material is heated by capacitive or ultrasonic action. Other known conveyors are screw conveyors which are large in diameter and have a heated shell. It is also known to provide separate mixing vessels, in which the material is heated as it is stirred and/or mixed and from which heated material is discharged by belt conveyors or the like. It is also known to provide a screw conveyor with heating pipe coils for heating the material to be processed or to preheat the material in a feeder screw conveyor in which the back pressure of the material is adjusted by an outlet valve or the like by which the preheating can also be controlled. All means which cause the material to be subjected to a higher pressure in the feeder conveyor or to be fed in another than the desired loose state increase the risk of an agglomeration of and a formation of lumps by the material being conveyed. Besides, the known heated feeder conveyors do not provide for satisfactory metering of the material. Whereas means for feeding material at a metered rate are known, they are independent in operation of means for heating material as it is fed.

In the processing of thermoplastics having different properties it has been conventional to use different extruders or to use in such extruders replaceable parts, e.g., as parts of the screw conveyor, which are selected in dependence on the nature of the specific material being processed. It will be appreciated that different thermoplastics materials may have to be extruded at different end temperatures and the resulting end temperature will depend not only on the pressure generated in the extruder and the temperature at which the material enters but also on the resistance of the material to deformation. Under given processing conditions, materials having a high resistance to deformation are subjected to a higher temperature rise as they pass through the extruder than materials which have a lower resistance to deformation. Besides, the work required for deformation depends to a large extent on the form in which the material is fed, e.g., on its average particle size. In the selection of the controlled rate at which a given material or mixture is fed to the extruder, consideration must also be given to the resistance presented to the flow of such material or mixture through the machine if an overloading of the extruder is to be prevented but the capacity of the machine should be utilized as fully as possible.

In general, the capacity of extruders would be increased or could be utilized more fully by the provision of a feeder conveyor which enables a feeding of the extruder at an exactly metered rate so that the extruder can be operated close to its capacity limit whereas there is no risk of an overloading and which also enables a preheating of the material to be processed to a controlled uniform temperature so that temperature differences within the material are substantially avoided and the material can be preheated, if required, to an adjusted temperature which is only closely below the temperature at which the material becomes sticky and can be softened. The use of a feeder conveyor which meets the above-mentioned requirements should enable the use of a given extruder for processing thermoplastic materials having widely different properties if the material to be fed is preheated to an exactly controlled temperature and fed at an exactly metered rate whereas a structural alteration of the extruder is not required.

It is an object of the invention to provide a feeder conveyor with which the above-mentioned requirements can be met.

This object is accomplished according to the invention in that the feeder conveyor constitutes a scraper flight conveyor having a heated slideway and spaced apart, successive scraper flights which are adapted to be driven and cooperate with the slideway and are operable to move the bulk material in discrete portions on the slideway, and the conveyor is operable at a controlled delivery rate and/or heat output.

In the feeder conveyor in accordance with the invention, material is conveyed in a loose state on the slideway and each scraper flight forwards only a relatively small portion of material. The material is revolved and mixed as it is conveyed so that all particles of the material are subjected to virtually identical conditions of film heat transfer and there are no measurable differences of temperature in the material as it leaves the conveyor. The conveyance of the material in a loose state results in a substantial degasification and an evaporation of adhered moisture; the gases and vapors can be freely removed.

Within the scope of the invention large heating surfaces can be provided in a compact conveyor if the slideway is formed by a plurality of superimposed, individually heatable trays, the scraper flights are combined to form star wheels which cooperate with these trays and are preferably adapted to be driven at a controlled speed by a common shaft, which is coaxial with the star wheels and trays, and the trays have mutually offset apertures for the passage of the material being conveyed. The heat output of such conveyor may be altered by a change of the number of trays. For this reason, entirely identical modules can be assembled to provide feeder conveyors having different heat outputs, such as are required for extruders having different capacity. The temperature rise of the material depends on the heating surface area which is available, the temperature of such heating surface, the transit time of the material through the feeder conveyor, and the loading of the conveyor. The contents of each of the cells defined by the successive scraper flights of a star wheel can be controlled by metering means which precede the feeder conveyor. The transit time depends on the number of trays and on the peripheral velocity, i.e., on the speed of the star wheels and the angle through which the material is moved on each tray; that angle depends on the angular spacing of the apertures in the trays.

The invention is illustrated by way of example in the accompanying drawing, in which FIG. 1 is a fragmentary view showing a portion of an extruder and a feeder conveyor, the most significant parts of which are shown in longitudinal section.

Figure 2:
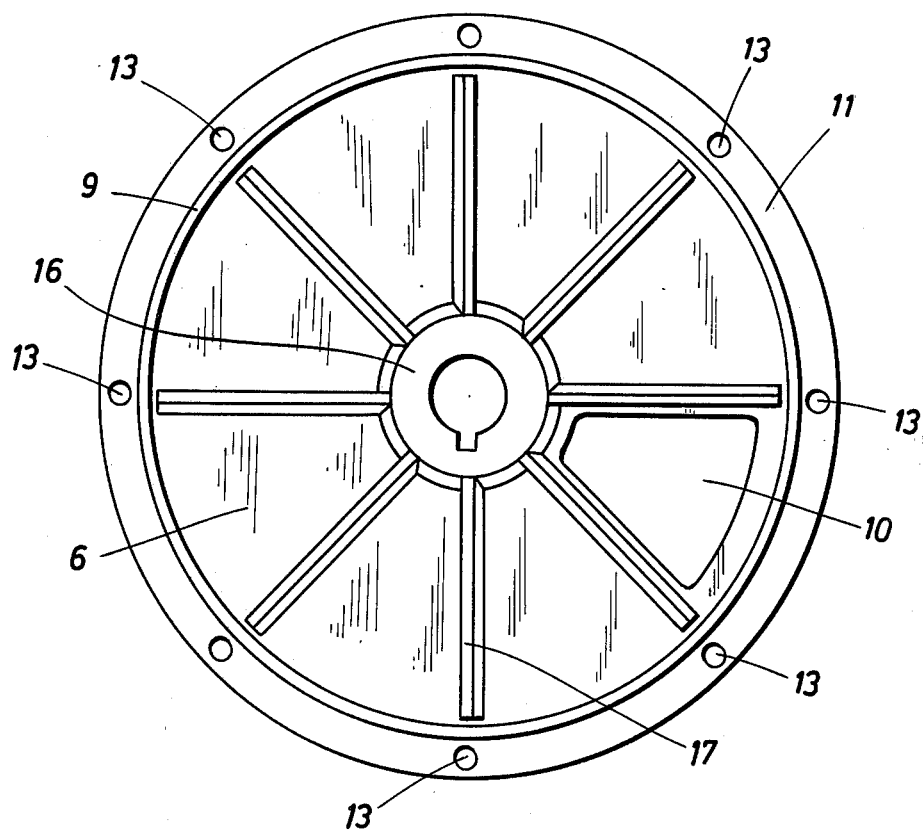

FIG. 2 is a top plan view showing a tray and a star wheel of the feeder conveyor.

Synthetic thermoplastic material, e.g., in the form of a powder, granules or the like, is fed by a feeder conveyor at an exactly predetermined temperature and at an exactly controlled rate to an inlet 2 of screw extruder 1.

The feeder conveyor comprises a feed hopper 3, which is charged with the material and discharges the latter through delivery pipe 4 into feeder conveyors proper. The feeder conveyor 5 comprises a plurality of identical trays 6, which have a central hub opening 7, larger in diameter than a shaft 8 protruding through the opening. The trays 6 have cylindrical walls 9, which constitute an outer shell of the conveyor. Each but the lowest tray rests on the cylindrical wall of the next lower tray. Each tray is also formed with an aperture 10. The trays 6 are held together at their outer edge portion 11 by tie rods 12, which extend through bores 13 formed in the outer edge portions of the trays 6 and hold the latter together. In the present embodiment, each tray is angularly offset from the next upper tray by the pitch of bores 13 in a direction which is opposite to the sense of rotation of the shaft 8.

The shaft 8 is driven at a presettable speed by a motor 14 through a speed-reducing transmission 15, which is preferably infinitely variable. Hubs of star wheels 17 are keyed to the shaft 8 and the outside diameter of these hubs 16 exceeds the diameter of the hub openings 7. The star wheels 17 comprise radial scraper flights, by which the annular chamber enclosed between successive trays is divided into cells and which slide on the upper surface of the associated tray.

A heater plate 18 is joined to the underside of each tray. The heat output of these plates 18 may be automatically controlled for each individual tray heater plate or for groups thereof or for all heater plates. For such automatic control, temperature sensors for measuring the temperature of the material being conveyed may be provided adjacent to the inlet and outlet ends of the conveyor and, if desired, at additional points of the path of travel of the material. These temperature sensors control the electric current supplied to electric resistance heating wires 18' in heater plates 18 to control the temperature in response thereto. The bottoms of the trays 6 may be provided on their upper surface with a friction-reducing, smooth covering, e.g., of polytetrafluoroethylene. The extruder is provided near its inlet 2 with an opening which communicates with a venting pipe 19, through which vapors and gases can escape from the extruder.

Metering means 28 constituted by an adjustable flap valve is mounted in the lower end of the pipe 4. The quantity of material contained in the cells defined by the scraper flights 17 during operation may also be controlled in that the height of the scraper flights of the uppermost star wheel is changed.

What is claimed is:

1. In combination with a screw extruder for thermoplastic bulk material, the screw extruder having an inlet: a scraper flight conveyor for preheating the thermoplastic bulk material and for feeding the preheated bulk material to the inlet of the screw extruder, the scraper flight conveyor comprising
   a. a delivery end receiving the thermoplastic bulk material,
   b. an outlet end in communication with the inlet of the screw extruder for delivering the preheated thermoplastic bulk material thereinto,
   c. slideway means between the delivery and outlet ends, the slideway means being composed of a succession of axially aligned, superposed trays arranged in series, each of the trays having an annular bottom constituting a slideway, each tray bottom having an eccentric port and the eccentric ports in successive ones of the tray bottoms being angularly offset in relation to the ports in the adjacent tray bottoms,
   d. a star wheel coaxial with the trays and associated with each of the trays, each star wheel including a set of angularly spaced scraper flights in scraping contact with the annular slideway bottom of the associated tray, adjacent ones of the scraper flights defining cells,
   e. a drive shaft coaxially extending through the tray bottoms, each of the star wheels being keyed to the drive shaft and the drive shaft being mounted for rotation with respect to the tray bottoms,
   f. means for rotating the drive shaft at a controlled speed to sweep the scraper flights along the tray bottoms whereby the thermoplastic bulk material received through the delivery end is pushed in discrete portions in said cells along the bottom of a first one of the trays, gravity fed through the port in said tray into a respective one of the cells associated with the next lower one of the trays whence the discrete portions are gravity fed through the ports in the succession of trays to the outlet end,
   g. means for controlling the delivery rate of the thermoplastic bulk material to the delivery end, and
   h. heating means associated with each of the tray bottoms and controllable to determine the heating temperature for each tray bottom.

2. In the combination of claim 1, wherein each of the trays and star wheels constitutes an identical module and the modules are detachably stacked whereby the number of trays may be readily changed.

3. In the combination of claim 1, a venting pipe for the escape of gases in the inlet of the extruder.

* * * * *